US009683527B2

(12) United States Patent
Tallman

(10) Patent No.: US 9,683,527 B2
(45) Date of Patent: Jun. 20, 2017

(54) SNORKEL APPARATUS WITH AUXILIARY AIR TUBE SUPPORTS

(71) Applicant: Kyle Tallman, Waxahachie, TX (US)

(72) Inventor: Kyle Tallman, Waxahachie, TX (US)

( * ) Notice: Subject to any disclaimer, the term of this patent is extended or adjusted under 35 U.S.C. 154(b) by 0 days.

(21) Appl. No.: 14/938,087

(22) Filed: Nov. 11, 2015

(65) Prior Publication Data

US 2017/0130682 A1    May 11, 2017

Related U.S. Application Data

(63) Continuation-in-part of application No. 29/545,079, filed on Nov. 9, 2015, and a continuation-in-part of application No. 14/938,049, filed on Nov. 11, 2015.

(51) Int. Cl.
| | | |
|---|---|---|
| *B60K 13/02* | (2006.01) | |
| *F02M 35/10* | (2006.01) | |
| *F02M 35/16* | (2006.01) | |
| *B62K 5/01* | (2013.01) | |

(52) U.S. Cl.
CPC ....... *F02M 35/10013* (2013.01); *B60K 13/02* (2013.01); *F02M 35/161* (2013.01); *B62K 5/01* (2013.01); *F02M 35/162* (2013.01)

(58) Field of Classification Search
CPC ....... F16L 3/22; F16L 3/23; F16L 3/24; F16L 3/26; F16L 3/237; F02M 35/162; F02M 35/10013
USPC ................................................ 180/68.3, 68.4
See application file for complete search history.

(56) References Cited

U.S. PATENT DOCUMENTS

| | | | | |
|---|---|---|---|---|
| 2,577,120 A * | 12/1951 | Franz | ........................ | F28D 1/00 138/111 |
| 4,366,878 A * | 1/1983 | Warf | ...................... | B60K 13/02 180/68.3 |
| 5,086,858 A * | 2/1992 | Mizuta | ................... | B60K 11/06 123/41.56 |
| 5,113,036 A * | 5/1992 | Arroyo | ................ | G02B 6/4415 138/117 |
| 5,358,442 A * | 10/1994 | Ekinci | .................... | B60H 1/262 454/143 |
| 5,803,654 A * | 9/1998 | Spease | .................... | F16C 1/262 248/74.1 |
| 5,950,748 A * | 9/1999 | Matsumoto | ............ | B62D 55/02 180/6.24 |
| 6,622,806 B1 * | 9/2003 | Matsuura | ............... | B60K 11/04 123/198 E |
| 6,751,382 B2 * | 6/2004 | McGarvey | .............. | F16L 3/222 174/168 |
| 6,892,842 B2 * | 5/2005 | Bouffard | ................ | B60K 11/04 180/68.3 |
| 7,249,798 B2 * | 7/2007 | Saito | ........................ | B60N 2/24 280/756 |
| 7,574,778 B2 * | 8/2009 | Marathe | .................. | F16G 11/00 138/115 |
| 7,637,978 B2 * | 12/2009 | Jung | .................... | F02M 35/022 55/396 |
| RE42,086 E * | 2/2011 | Saito | ........................ | B60N 2/24 280/756 |

(Continued)

*Primary Examiner* — J. Allen Shriver, II
*Assistant Examiner* — Travis Coolman
(74) *Attorney, Agent, or Firm* — Warren V. Norred; Norred Law, PLLC

(57) ABSTRACT

A snorkel for allowing an all-terrain vehicle (ATV") to travel while at least partially submerged, in which the snorkel is constructed with an octagonal riser and auxiliary tube guides.

6 Claims, 8 Drawing Sheets

(56) References Cited

U.S. PATENT DOCUMENTS

| | | | | |
|---|---|---|---|---|
| 7,931,106 B1* | 4/2011 | Suzuki | B62D 23/005 | 180/311 |
| D637,205 S * | 5/2011 | Luxon | D12/400 | |
| D637,206 S * | 5/2011 | Luxon | D12/400 | |
| D649,162 S * | 11/2011 | Luxon | D12/400 | |
| 8,245,733 B2* | 8/2012 | Renaud | F16L 3/06 | 138/106 |
| 8,251,170 B2* | 8/2012 | Miura | B60K 13/02 | 180/68.1 |
| 8,434,580 B2* | 5/2013 | Azuma | F02M 35/162 | 180/291 |
| D693,370 S * | 11/2013 | Randhawa | D15/5 | |
| D698,831 S * | 2/2014 | Adamson | D15/28 | |
| 8,857,548 B2* | 10/2014 | Yamamoto | F16L 3/23 | 138/106 |
| 8,919,704 B2* | 12/2014 | Lee | F16L 3/26 | 248/58 |
| 8,960,347 B2* | 2/2015 | Bennett | B60K 13/02 | 180/68.3 |
| 9,169,812 B2* | 10/2015 | Hirukawa | F02M 35/162 | |
| 9,234,484 B2* | 1/2016 | Lewington | F02M 35/10013 | |
| 2002/0023792 A1* | 2/2002 | Bouffard | B60K 11/04 | 180/68.4 |
| 2003/0213628 A1* | 11/2003 | Rioux | B62K 5/01 | 180/68.3 |
| 2004/0104315 A1* | 6/2004 | Betz | H02G 3/26 | 248/74.2 |
| 2005/0120652 A1* | 6/2005 | Cacciani | F16L 3/13 | 52/302.1 |
| 2005/0173597 A1* | 8/2005 | Farrell | F16L 3/22 | 248/68.1 |
| 2006/0185639 A1* | 8/2006 | Rosenbaum | F02M 35/10137 | 123/184.21 |
| 2009/0242064 A1* | 10/2009 | Lai | F16L 3/26 | 138/117 |
| 2014/0053938 A1* | 2/2014 | Persaud | F16L 3/10 | 138/106 |
| 2014/0360794 A1* | 12/2014 | Tallman | B60K 13/02 | 180/68.3 |
| 2016/0176284 A1* | 6/2016 | Nugteren | B60K 13/04 | 180/309 |
| 2016/0176287 A1* | 6/2016 | Ripley | B60K 17/08 | 180/365 |

* cited by examiner

103

SNORKEL APPARATUS WITH AUXILIARY AIR TUBE SUPPORTS

TECHNICAL FIELD OF THE INVENTION

The present disclosure relates generally to a snorkel kit for all-terrain vehicles (ATVs), allowing the engines to receive intake air though the engine itself may be underwater.

RELATIONSHIP TO OTHER PATENT APPLICATIONS

The present disclosure invention is a continuation-in-part application of U.S. patent application 29/545,079, filed Nov. 9, 2015, and U.S. patent application Ser. No. 14/938,049, filed Nov. 11, 2015, and herein adopts the disclosure therein provided in full by reference.

BACKGROUND OF THE INVENTION

Since at least the 1950s, specialty vehicles have been equipped with snorkels to allow them to travel while underwater, either in whole or in part. These snorkels are affixed to the intake manifold of combustion engines and extend to a height above the motor so it can operate while submerged.

As opposed to military vehicles which are produced in number to a specific design, casual ATV recreation users tend to be highly individualized, with vehicle owners installing after-market kits that require considerable modification to the vehicle on which the installation is occurring. Users prefer installations that require minimal changes to the vehicle to maintain resale value, while providing individualization.

Users also struggle with snorkel kits which are made of inexpensive polyvinyl chloride (PVC) pipes. PVC pipe do not appear to be an organic part of the vehicle. When damaged or even scratched, the white of the PVC piping is revealed, which is unsightly and therefore undesirable.

Even with a raised pipe from an engine's intake, water splashes up and into the intake of the pipes (the raised end opposite of the end connected to the motor), causing the motor to sputter and even fail, necessitating a cover on the top of the pipes to keep out rain or casual splashing.

Snorkel kits are designed to provide air to the engine intake, but other elements of the ATV must also have continuous access to air, including but not limited to front differential, rear differential, gas tank and transmission.

One potential solution to the problem is to run multiple tubes from the various aforementioned elements and affix them to the main snorkels used to provide intake air by plastic ties, hose clamps. However, this solution creates a more complex set of routing for all the hoses which is confusing and difficult to work with. This solution also is unsightly and esthetically displeasing.

Another potential solution to the problem is drill a hole in the bottom of the main snorkel tube near its bottom at the engine, and to then run tubes from that point. This approach suffers from excess leakage in the tube at fragile connection points. Thus, the need for snorkel tubes to remain water-tight disallows a construction in which a secondary tube might be affixed near the bottom of the snorkel.

To properly source air to the auxiliary elements, the off-road vehicle industry needs a snorkel system that provides multiple air sources without additional undue complicated construction.

SUMMARY OF THE INVENTION

The present disclosure provides a molded snorkel construction which includes hose guides built into the air intake snorkel tube used to modify an all-terrain vehicle so that the vehicle can travel in the water in deeper water than would otherwise be possible, while providing air to multiple mechanical elements on the vehicle.

This particular snorkel kit differs from others in the market by using an octagonal air intake tube that has guides on the top exterior of the tube to hold multiple smaller auxiliary tubes in place in an ornamentally pleasing manner and provide protection for the tubing along the side. The auxiliary tube guides have periodic angled openings to allow the tubes within them to leave the guides with a large turn radius.

The disclosure included with this application is one embodiment that provides for two auxiliary tubes on one side of a snorkel tube, but this is merely one embodiment. With this invention, one can have multiple tubes on multiple sides using the same approach.

In addition to the auxiliary guide tubes, the invention can built with a sliding connection elements which connect together to create a single snorkel assembly.

Other features and advantages of the present disclosure will be apparent to those of ordinary skill in the art upon reference to the following detailed description taken in conjunction with the accompanying drawings.

BRIEF DESCRIPTION OF THE DRAWINGS

For a better understanding of the disclosure, and to show by way of example how the same may be carried into effect, reference is now made to the detailed description along with the accompanying figures in which corresponding numerals in the different figures refer to corresponding parts and in which.

DETAILED DESCRIPTION OF THE INVENTION

While the making and using of various embodiments of the present disclosure are discussed in detail below, it should be appreciated that the present disclosure provides many applicable inventive concepts, which can be embodied in a wide variety of specific contexts. The disclosure is primarily described and illustrated hereinafter in conjunction with various embodiments of the presently-described systems and methods. The specific embodiments discussed herein are, however, merely illustrative of specific ways to make and use the disclosure and do not limit the scope of the disclosure.

The inventor has constructed the invention using black molded 1.5", 2", and 3" octagonal piping, but the drawings and discussion employ 2" piping. Other diameters would work just as well and the invention is not limited to any particular size.

The invention as shown is constructed of two-piece molds, manufactured by special order for the inventor. Other construction types are possible, including one piece molding. The inventor is using two-piece molding for its cost, but construction types change with technology—the invention is not limited to the element construction as described.

This invention addresses the difficulty in properly mounting snorkels by adding a connection element that allows for an easy assembly of multiple snorkel tubes, and adds flat surfaces to the riser tubes which assist to make a stable connection between the invention and nearby mounting elements, such as roll bars and other vehicle frame structures.

Figure 1:
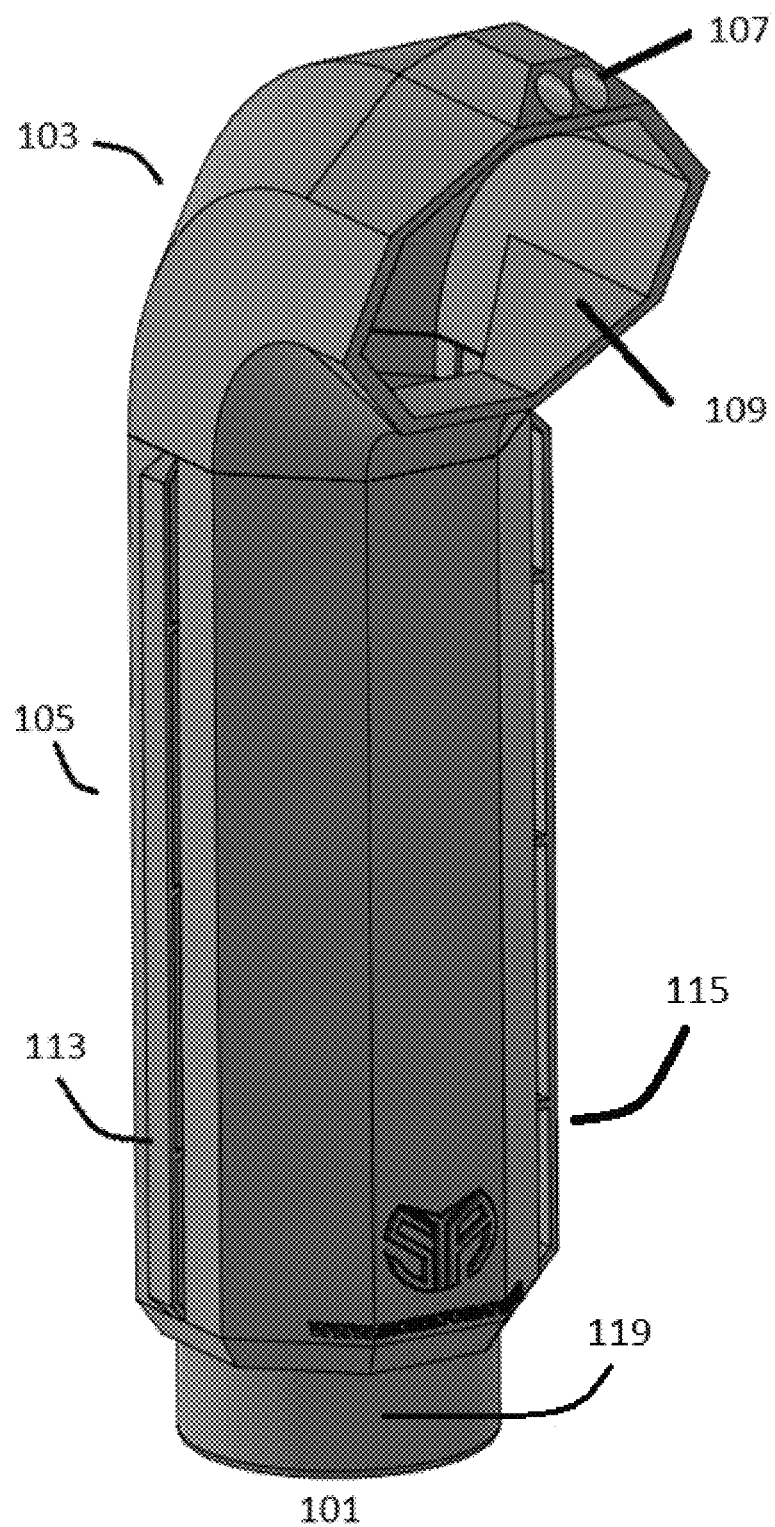
FIG. 1 depicts an orthogonal view of the back of the invention.

FIG. 1 depicts an orthogonal view of a single Snorkel Assembly 101, comprising a Bend 103 that sits on a Riser 105. On the top of the Bend 103, this view shows the Bend Aux Tube Guide 107, comprising two round holes molded into a raised portion of the Bend 103.

As this and all of the drawings show, the main body of the invention is roughly octagonal, a shape providing flat surfaces so the invention's front and back sides can sit flush with stability against a cross bar of an all-terrain vehicle. At the bottom of the snorkel is the round Hose Connection 119, making possible a traditional connection to the vehicle's intake using a hose clamp or other securing mechanism.

The Male Riser Connection 113 is visible to the left side of the Riser 105 in FIG. 1, and the Female Riser Connection is partially visible on the right side of the Riser 105. These connections allow a user to fix two of the Snorkel Assemblies 101 together and build a rugged snorkel grouped assembly that may be treated as one part for mounting purposes.

Figure 2:
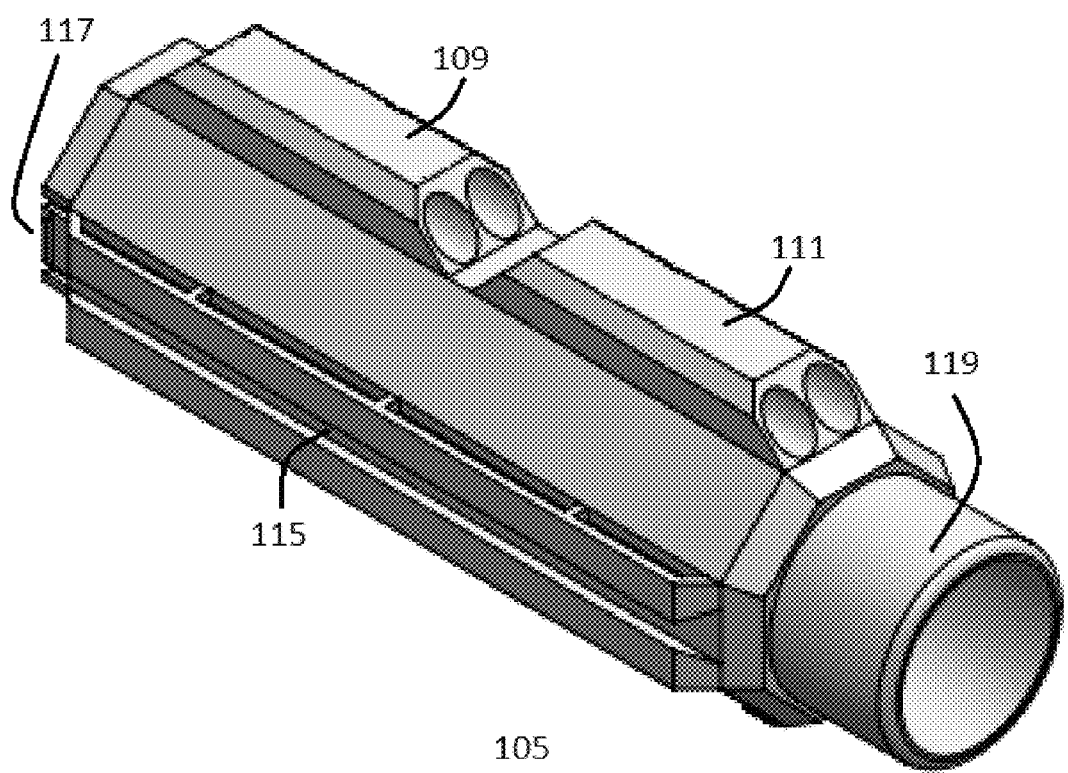
FIG. 2 depicts a bottom view of the riser depicts an orthogonal view of the invention's Riser.

FIG. 2 shows just the Riser 105 element of the invention, comprising the octagonal tube structure, rounded lower end, the Upper Aux Tube Guide 109 and Lower Aux Tube Guide 111, both of which have angled tube guide entrances, as well as the Female Riser Connection 115, Assembly Clip 117, and Hose Connection 119.

Figure 3:
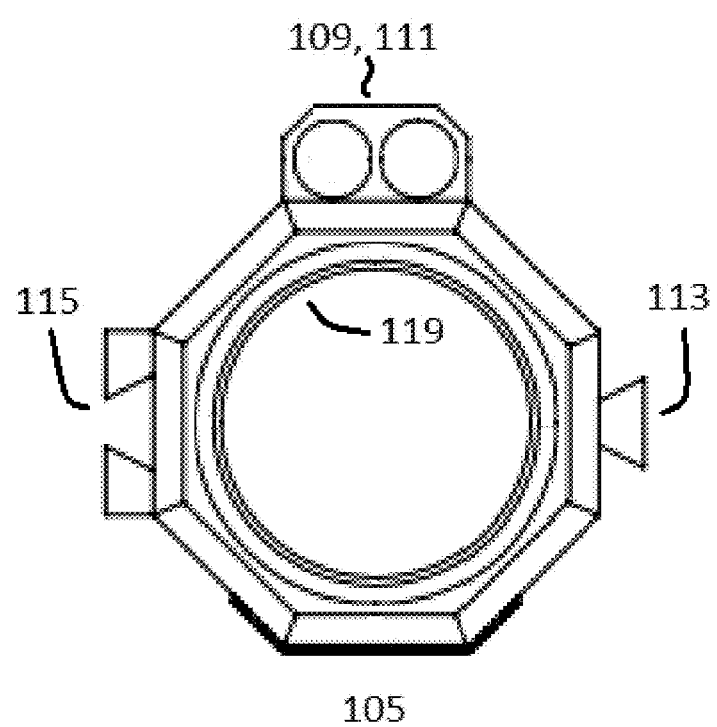
FIG. 3 depicts a bottom (and top) view of the invention's Riser.

FIG. 3 shows the bottom view of the Riser 105, particularly the Male Riser Connection 113 and Female Riser Connection 115, and the outline of the Upper and Lower Aux Tube Guides 109, 111.

Figure 4:
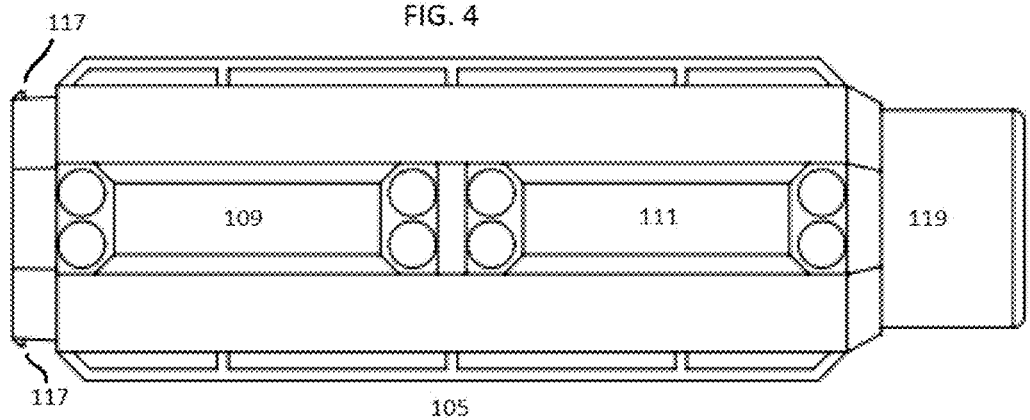
FIG. 4 depicts a front view of the invention's Riser.
Figure 5:
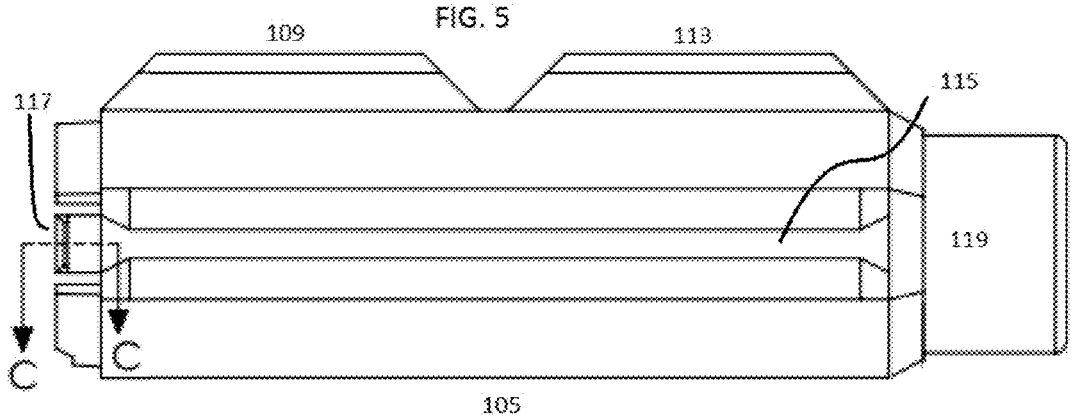
FIG. 5 depicts a right side view of the invention's Riser.

FIGS. 4 and 5 show a front and right side view of the Riser 105 and its constituent elements, including the Upper Aux Tube Guide 109, Upper Aux Tube Guide 109, Lower Aux Tube Guide 111, Hose Connection 119, and Assembly Clips 117.

Figure 5A:
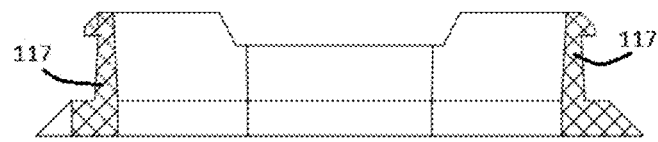
FIG. 5A depicts the cross-section view defined by lines C-C on FIG. 5.

FIG. 5A shows the cross-section of the Assembly Clip 117 which the current embodiment of the invention uses to affix the Bend 103 to the Riser 105.

Figure 6:
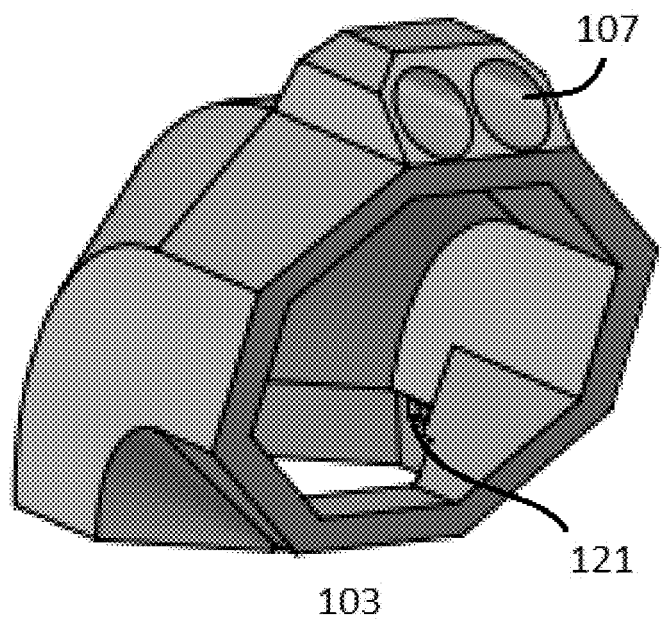
FIG. 6 is an orthogonal view of the invention's Bend.
Figure 7:
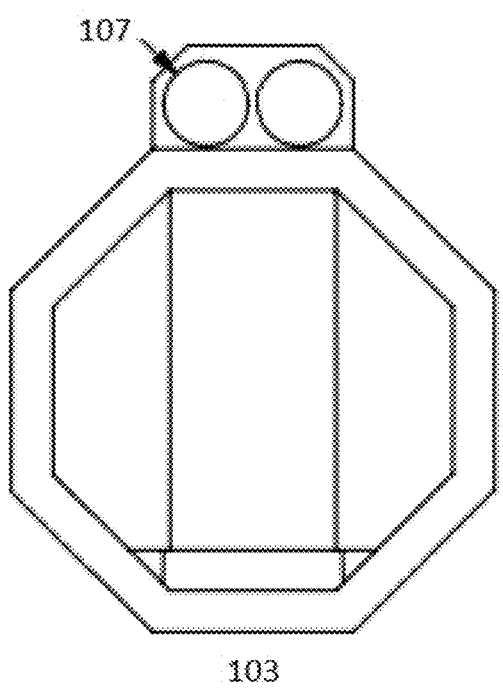
FIG. 7 is a back view of the invention's Bend.
Figure 8:
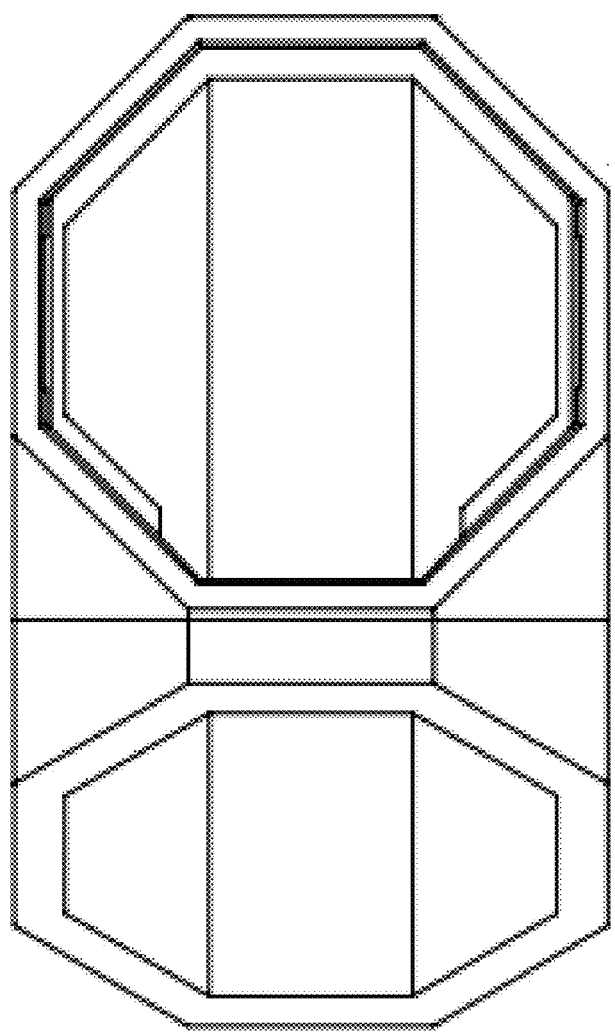
FIG. 8 is a bottom view of the invention's Bend.

As shown in FIG. 6, the Bend 103 has an Assembly Ridge 121 built into both sides which match up to the Assembly Clip 117. To construct this embodiment of the invention, a user slides the Bend 103 onto the top of the Riser 105 which compresses the Assembly Clip 117 until it is far enough into the Riser 105 so that it then expands over the Assembly Ridge 121, holding the Snorkel Assembly 101 together.

Figure 9:
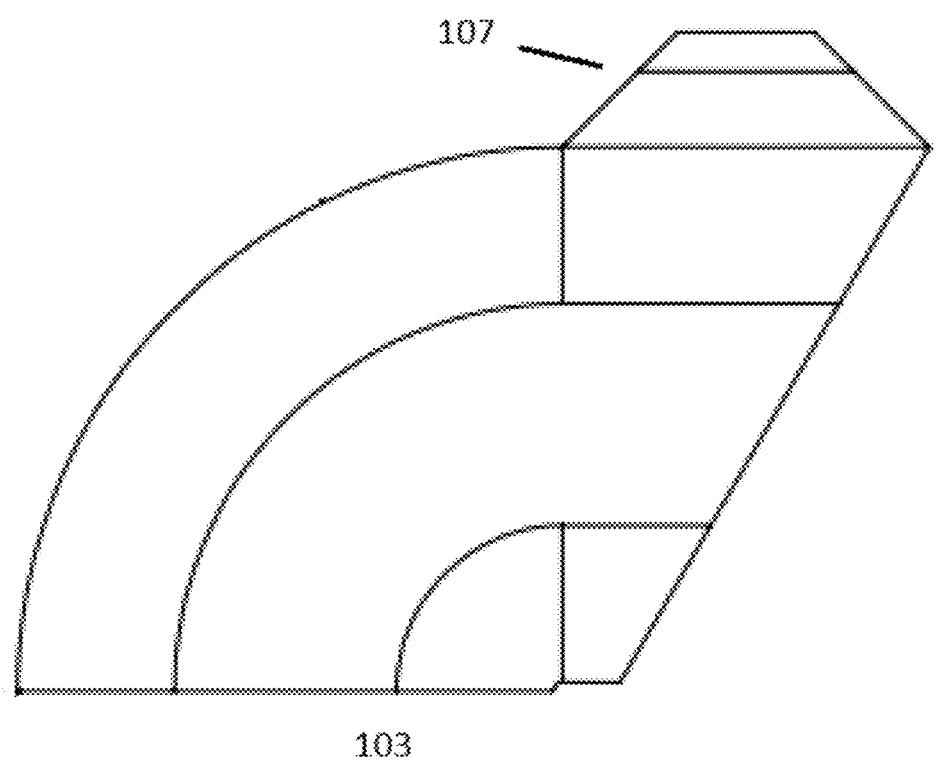
FIG. 9 is a right side view of the invention's Bend.

FIG. 9 shows one of the symmetrical sides of the invention's Bend 103. This view shows that the Bend Aux Tube Guide 107 is angled on each end for easy entrance and further shows the Bend 103 to be constructed so that any auxiliary tubes installed into the Guide 107 are protected in part from direct contact with debris which might impact the Bend 103 because the angled Guide 107 holds the auxiliary tube end in a recess which does not extend to the end of the Bend 103 (the rightmost point of the Bend as seen in FIG. 9).

Figure 10:
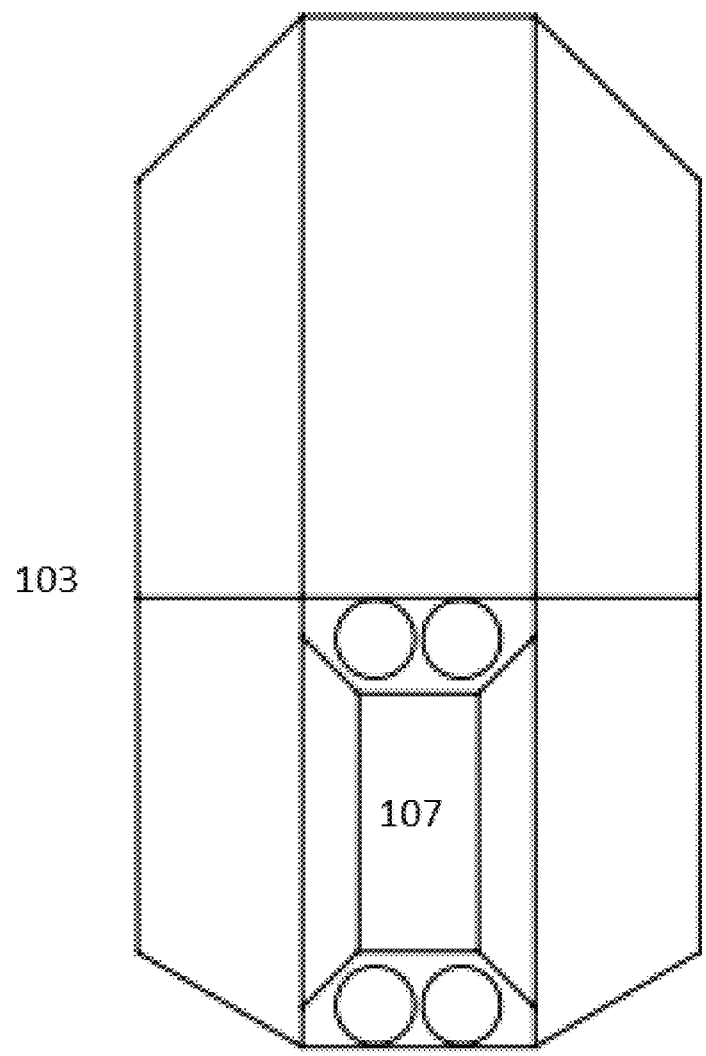
FIG. 10 is a top view of the invention's Bend.

FIG. 10 is a top view of the Bend 103 which also shows the Bend Aux Tube Guide 107 construction.

When assembled, the user can install the Snorkel Assembly in the usual way common in the industry, using a hose clamp to connect the invention's Hose Connection 119 to the vehicle intake. Any desired auxiliary tubes can be run through the tube guides and down to the vehicle elements which require an air source to function properly. As opposed to traditional hose clamps, the three hose guides (Bend Aux Tube Guide 107, Upper Aux Tube Guide 109, and Lower Aux Tube Guide 111) provide protection to the tubes, besides firmly holding them in place. The breaks between the tubes allow a user to run multiple tubes into each guide, or to have a tube enter the Upper Aux Tube Guide 109 without going through the Lower Aux Tube Guide 111, for maximum flexibility.

The octagonal shape of the Riser 105 allows for a sturdy flat surface so the invention can, when installed, sit flat against a roll bar or other nearby surface, rather than the usual round tube that more easily rolls on nearby surfaces.

Lastly, the Riser 105 has a Male Riser Connection 113 running vertically on one side, and a Female Riser Connection 115 running vertically on the opposite side. This construction allows a user to connect multiple Snorkel Assemblies 101 together so they create a rugged assembly that mounts as one device on a vehicle.

Not shown on the drawings or claimed at this point, a user could also use the Male and Female Riser Connections 113, 115 to connect the invention to appropriately-shaped clips mounted on a vehicle, so a user need only disconnect the bottom of the Snorkel Assembly 101 from a vehicle, and then slide the assembly off of the Riser Connections 113, 115. This mounting approach would be particularly appealing to an ATV user who often disassembles his vehicle and desires a way to remove or mount the invention quickly.

A user can also use one the tube guides in multiple ways, both to carry auxiliary tubes, but also for mounting. For example, the drawings show a two-path Tube Guide structure, with a single break along the Riser 105, which allows a user to bring two tubes from the bottom of the Riser 105 through all three tube guides, with the tubes having outside diameter that fits just within the tube guides. But a user might also use just the paths as defined by the Upper Aux Tube Guide 109 for two tubes, and two other auxiliary tubes to be fixed in place in the two paths defined by the Lower Aux Tube Guide 111. Or in yet another configuration, a single tube might be inserted into the entire right length of the Bend, Upper, and Lower Tube Guides, while the left side of the Upper Aux Tube Guide is used for mounting the invention with a plastic tie that goes through the guide and around a roll bar.

The embodiment described herein is presented for purposes of illustration and explanation only, as the invention can be constructed using many materials and configured in many ways in accordance with the present disclosure.

For example, the invention as shown in the drawings and discussed in this disclosure uses an octagonal-shaped Riser 105, but the invention would also function with a Riser 105 shaped in many ways, so long as it has a flat side for ease of mounting. The Male and Female Riser Connections 113, 115 could even be employed on a triangular-shaped Riser 105 by putting both a male and female connection on each of the three sides, so two triangular riser tubes can connect together, though this is a mere example and not considered the best embodiment by the inventor.

The invention as currently constructed uses a two-piece molded construction, but in the future, a single mold may be employed, or some other similar construction technique. In such an approach, the Assembly Clip 117 and Assembly Ridge 121 may not be necessary. In yet another alternative, the invention might be built in two halves, each shaped as a half-octagon, that snap together along the long sides.

A legend of the drawings includes the following:

| 101 | Snorkel Assembly | 103 | Bend |
|---|---|---|---|
| 105 | Riser | | |
| 107 | Bend Aux Tube Guide | | |
| 109 | Upper Aux Tube Guide | | |
| 111 | Lower Aux Tube Guide | | |
| 113 | Male Riser Connection | | |
| 115 | Female Riser Connection | | |
| 117 | Assembly Clip | | |
| 119 | Hose Connection | | |
| 121 | Assembly Ridge | | |

What is claimed is:

1. A snorkel assembly for an all-terrain vehicle ("ATV"), comprising:
   a) a straight tube which is constructed to connect to an ATV air intake at one end;
   b) at least one tube guide extending vertically along the straight tube;
   c) the at least one tube guide providing substantial protection to an auxiliary tube placed within said tube guide.

2. A snorkel assembly as in claim 1 in which the at least one tube guide has angled entrances.

3. A snorkel assembly as in claim 1 comprising at least two tube guides running parallel along the straight tube.

4. A snorkel assembly as in claim 1 in which the at least one tube guide has breaks along its path so that any auxiliary tube placed within the at least one tube guide can enter or leave any particular guide path at multiple locations along a given guide path.

5. A snorkel assembly as in claim 1 in which the straight tube is shaped as a regular polygon with at least three defined sides and which have male and female corresponding elements to allow multiple straight tubes to connect together and form one assembly.

6. A snorkel assembly as in claim 1 in which the snorkel assembly includes a bend and overhanging angled opening in said straight tube that discourages rain from falling into said straight tube and on which is a tube guide is oriented at a right angle to said straight tube.

* * * * *